Sept. 27, 1932.      D. S. DAVIS      1,879,123
PORTABLE REPAIR STAND
Filed May 28, 1930

Daniel S. Davis
INVENTOR

BY *Victor J. Evans*
ATTORNEY

Patented Sept. 27, 1932

1,879,123

UNITED STATES PATENT OFFICE

DANIEL STEPHEN DAVIS, OF WHEELING, WEST VIRGINIA

PORTABLE REPAIR STAND

Application filed May 28, 1930. Serial No. 456,640.

This invention relates to a portable repair stand, the general object of the invention being to provide a number of small stands for holding a motor vehicle or the like elevated so that one can work upon the bottom parts thereof, and by making each stand of small size, just sufficient to hold a wheel of a vehicle, the stand will not occupy much space when not in use.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1:
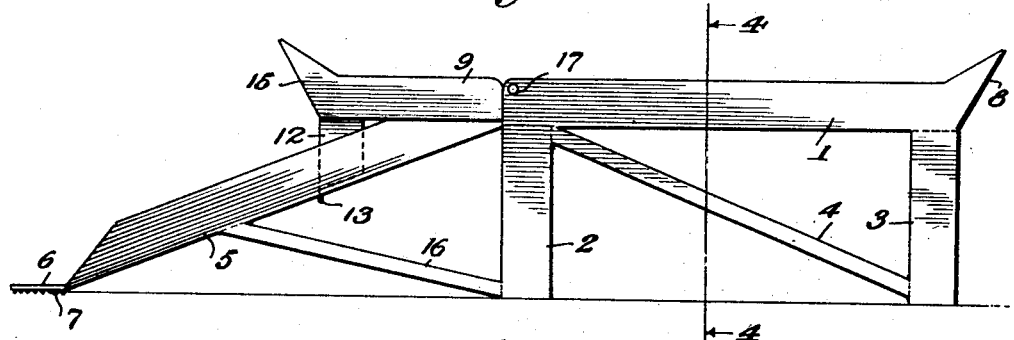
Figure 1 is an elevation showing the stand in a position for holding a wheel of a vehicle thereon.
Figure 2:
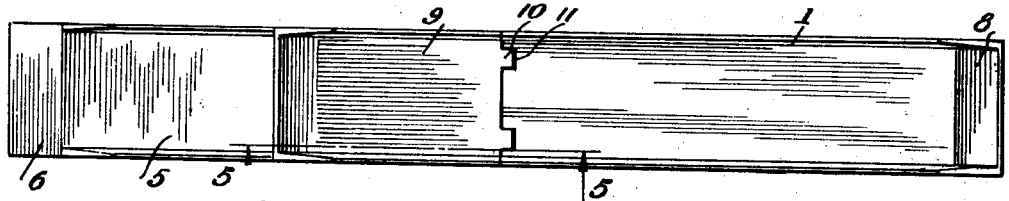
Figure 2 is a top plan view of Figure 1.
Figure 3:
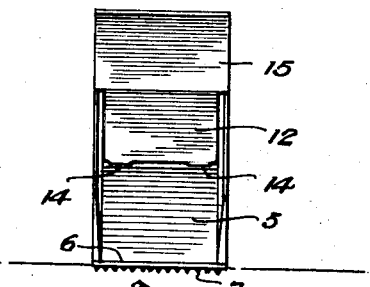
Figure 3 is a view of the front end of the stand.
Figure 4:
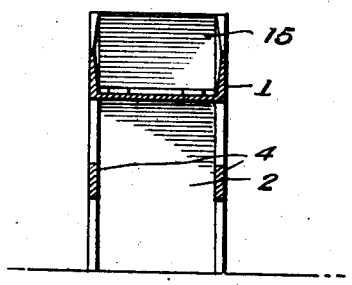
Figure 4 is a section on line 4—4 of Figure 1.
Figure 5:
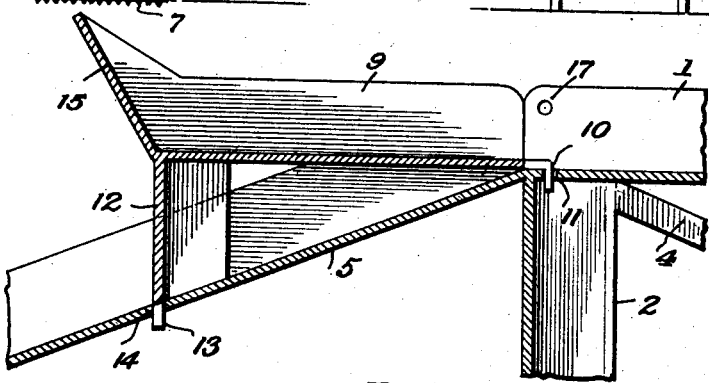
Figure 5 is a section on line 5—5 of Figure 2.

In these views, the numeral 1 indicates a channel shaped horizontal member which is supported by the front leg 2 and the rear leg 3, these legs also being of channel iron and the device is braced by a diagonal member 4. A runway 5, also of channel iron, is connected to the front end of the channel iron 1 and this member slopes downwardly and forwardly and has a flat extension 6 at its front end for resting on the floor or other surface. The under face of this extension is formed with the projections 7 to prevent the device from slipping. The rear end of the member 1 is formed with an upwardly and rearwardly sloping part 8 which acts as a stop or chock for the wheel of a vehicle resting on the member 1.

A channel shaped extension member 9 has the hooks 10 at one end thereof which are adapted to engage the holes 11 formed in the front end of the member 1 and this member 9 has a leg 12 formed with the projections 13 at its lower end for engaging the holes 14 formed in the runway. The lower end of the leg 12 is beveled so as to conform to the sloping surface of the runway on which it rests and the front end of the member 9 is also formed with a stop or chock forming part 15. The runway is also provided with a brace 16 and holes 17 are formed in the top front corners of the member 1.

From the foregoing it will be seen that two wheels of a vehicle can be run up the runways of two of these devices upon the members 1 and then the extension members 9 are put in place so that the wheel engaging surface of each member is lengthened to permit a certain degree of movement of the vehicle. The wheels are prevented from running off the members by the stop parts 18 and 15. Thus either the front or rear of the vehicle is held in raised position, according to whether the front or rear wheels are run upon the device so that a mechanic or other person can work upon the bottom part of the vehicle. When the vehicle is to be removed from the device, it is simply necessary to remove the extension members 9 so that the wheels can run down the runways 5. If it is not desired to use the extension members 9, bolts, rods or the like can be passed through the holes 17 to act as stops for preventing the wheels from running off the front ends of the members 1 of the two devices.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A stand of the kind described comprising a horizontally disposed elevated trough closed at one end and open at its opposite end, an inclined runway leading from a foundation to the open end of the trough, and a closure extension for the open end of the trough and detachably supported to provide a continuation of the latter over the runway.

2. A stand of the kind described comprising a horizontally disposed elevated trough closed at one end and open at its opposite end, an inclined runway leading from a foundation to the open end of the trough, a closure extension for the open end of the trough and detachably supported to provide a continuation of the latter over the runway, and means on the closure extension to engage the runway and said trough to detachably secure the extension thereto.

In testimony whereof I affix my signature.

DANIEL STEPHEN DAVIS.